(12) United States Patent
Oyama et al.

(10) Patent No.: US 8,040,701 B2
(45) Date of Patent: *Oct. 18, 2011

(54) CONTROL CIRCUIT AND METHOD FOR CHARGE PUMP CIRCUIT WITH PULSE MODULATION

(75) Inventors: Manabu Oyama, Kyoto (JP); Daisuke Uchimoto, Kyoto (JP)

(73) Assignee: Rohm Co., Ltd. (JP)

( * ) Notice: Subject to any disclaimer, the term of this patent is extended or adjusted under 35 U.S.C. 154(b) by 596 days.

This patent is subject to a terminal disclaimer.

(21) Appl. No.: 12/181,008

(22) Filed: Jul. 28, 2008

(65) Prior Publication Data

US 2009/0027022 A1 Jan. 29, 2009

(30) Foreign Application Priority Data

Jul. 26, 2007 (JP) ................................. 2007-195082

(51) Int. Cl.
*H02M 3/07* (2006.01)
(52) U.S. Cl. ........................................................ 363/60
(58) Field of Classification Search .................... 363/59, 363/60; 327/536
See application file for complete search history.

(56) References Cited

U.S. PATENT DOCUMENTS

| 6,400,211 | B1 * | 6/2002 | Yokomizo et al. | 327/536 |
| 6,917,240 | B2 * | 7/2005 | Trafton et al. | 327/540 |
| 7,737,767 | B2 * | 6/2010 | Oyama et al. | 327/536 |
| 7,847,621 | B2 * | 12/2010 | Oyama et al. | 327/536 |
| 2008/0158915 | A1 * | 7/2008 | Williams | 363/21.06 |
| 2009/0027022 | A1 * | 1/2009 | Oyama et al. | 323/282 |

FOREIGN PATENT DOCUMENTS

JP 2000262043 9/2000

* cited by examiner

*Primary Examiner* — Jeffrey Sterrett
(74) *Attorney, Agent, or Firm* — Cantor Colburn LLP

(57) ABSTRACT

A first switch group includes switches provided on a path for charging a flying capacitor using an input voltage. A second switch group includes switches provided on a path for charging an output capacitor using charge stored in the flying capacitor. A pulse modulator generates a pulse signal having a duty ratio adjusted so that a feedback voltage corresponding to an output voltage of a charge pump circuit matches a given reference voltage. A driver receives the pulse signal from the pulse modulator, and turns on either one of the first switch group and the second switch group during a period corresponding to a high-time of the pulse signal and turns on the other switch group during a period corresponding to a low-time thereof.

15 Claims, 3 Drawing Sheets

CONTROL CIRCUIT AND METHOD FOR CHARGE PUMP CIRCUIT WITH PULSE MODULATION

BACKGROUND OF THE INVENTION

1. Field of the Invention

The present invention relates to a charge pump circuit.

2. Description of the Related Art

In recent years, in electronics such as a mobile phone and a PDA (Personal Digital Assistants), are provided with devices requiring a drive voltage higher than a battery voltage, like an LED (Light Emitting Diode) used in a liquid crystal backlight. For example, in such a small information terminal, a lithium-ion battery is often used. An output voltage of the lithium-ion battery is approximately 3.5 V in usual condition and approximately 4.2 V in full charged condition, while an LED requires a higher voltage than a voltage of the battery. Where the higher voltage than the battery voltage is required, the battery voltage is stepped up by a charge pump circuit or a switching regulator, thus a voltage required for driving an LED is obtained.

The charge pump circuit generates an output voltage obtained by multiplying an input voltage by a given step-up rate. For example, if an battery voltage is 3 V and a step-up rate is two, an output voltage is fixed to 6 V. Accordingly, when a load circuit requires a drive voltage lower than 6 V, conventionally, a power transistor needs to be inserted into input side or output side of a charge pump circuit to adjust on-resistance and thereby adjust output voltage. For example, Japanese Patent Application (laid Open) No. 2000-262043 has disclosed a related technique.

Use of the technique disclosed in Japanese Patent Application (laid Open) No. 2000-262043, requiring a power transistor, increases the number of circuit components and a circuit area.

SUMMARY OF THE INVENTION

The present invention is provided in view of the foregoing problems, and general purpose of the present invention is to provide a charge pump circuit capable of adjusting an output voltage to a desired value while restraining an increase in a circuit scale.

An embodiment of the present invention relates to a control circuit for a charge pump circuit having at least one flying capacitor and at least one output capacitor. The control circuit includes: a first switch group including at least one switch provided on a path for charging the flying capacitor using an input voltage; a second switch group including at least one switch provided on a path for charging the output capacitor using charge stored in the flying capacitor; a pulse modulator which generates a pulse signal having a duty ratio adjusted so that a feedback voltage corresponding to an output voltage of the charge pump circuit matches a given reference voltage; and a driver which receives the pulse signal from the pulse modulator, turns on one of the first switch group and the second switch group during a period corresponding to a high-time of the pulse signal and turns on the other switch group during a period corresponding to a low-time of the pulse signal, in which the pulse modulator limits the duty ratio of the pulse signal within a given range.

According to this embodiment, the charging period for the flying capacitor and the charging period for the output capacitor are adjusted by feedback in accordance with the duty ratio of a pulse signal. Hence, an output voltage of the charge pump circuit can be stabilized to a desired value without providing a regulator before or behind the charge pump circuit.

The pulse modulator may perform pulse width modulation, in which a period of time is constant and pulse width is changed.

(1) In an embodiment, the pulse modulator may modulate a pulse signal so that the high-time thereof becomes longer as the feedback voltage becomes lower and perform modulation so that the duty ratio of the pulse signal changes within a range equal to or smaller than a predetermined upper limit. The "duty ratio" refers to a percentage of a high-time to a period of time of a pulse signal.

In the embodiment, a driver may turn on the first switch group during a period corresponding to the high-time of the pulse signal and turn on the second switch group during a period corresponding to the low-time thereof.

In this case, the period during which the second switch group is on is longer than the period during which the first switch group is on, thus suppressing ripple of an output voltage.

The upper limit may be set to be larger than 0% and equal to or smaller than the duty ratio, which makes electric current supply capacity to a load of the charge pump circuit maximum.

Charge supplied to the output capacitor increases more as the duty ratio increases from 0% and becomes maximum when the duty ratio is a given value. When the duty ratio becomes larger beyond the given value, charge supplied to the output capacitor decreases. Accordingly, by setting the upper limit of the duty ratio of a pulse signal at a given value or smaller, the circuit can be operated stably.

The pulse modulator may further compare the duty ratio of a pulse signal with a given lower limit and, when the duty ratio of the pulse signal is smaller than the lower limit, the level of the pulse signal may be fixed.

As a load current decreases at light load, a feedback voltage becomes higher and then the duty ratio becomes smaller. When the duty ratio becomes smaller than the lower limit, the duty ratio of the pulse signal is fixed, thereby temporarily stopping the switching operation of the charge pump circuit for intermittent operation. Hence, the current consumption of the charge pump circuit can be suppressed.

In the pulse modulator, it is preferable that the pulse modulator fixes the level of the pulse signal so that the second switch group is turned on when the duty ratio of a pulse signal is smaller than the lower limit.

In this case, the switching operation stops while the capacity connected to a load is large, and therefore ripple of an output voltage Vout can be suppressed.

(2) In another embodiment, the pulse modulator may modulate a pulse signal so that a low-time thereof becomes longer as the feedback voltage is lower, and performs modulation so that the duty ratio of the pulse signal changes within the range equal to or larger than a predetermined lower limit.

A driver may turn on the first switch group during a period corresponding to the low-time of the pulse signal and turn on the second switch group during a period corresponding to the high-time thereof.

In this case, the period during which the second switch group is on is longer than the period during which the first switch group is on, thus suppressing ripple of an output voltage.

The lower limit may be set to be smaller than 100% and equal to or larger than the duty ratio, which makes current supply capacity to a load of the charge pump circuit maximum.

Charge supplied to the output capacitor increases more as the duty ratio decreases from 100% and becomes maximum when the duty ratio is a given value. When the duty ratio becomes smaller beyond the given value, charge to be supplied to the output capacitor decreases. Accordingly, by setting the lower limit of the duty ratio of a pulse signal at a given value or smaller, the circuit can be operated stably.

The pulse modulator may further set an upper limit to the duty ratio of the pulse signal and fix the level of the pulse signal when the duty ratio of the pulse signal is larger than the upper limit. In this case, intermittent operation may be performed at light load, thus suppressing current consumption.

In the pulse modulator, it is preferable that the pulse modulator fixes the level of the pulse signal so that the second switch group is turned on when the duty ratio of the pulse signal is larger than the upper limit.

In this case, the switching operation stops while the capacity connected to a load is large, and therefore ripple of an output voltage Vout can be suppressed.

Another embodiment of the present invention relates to a charge pump circuit. The charge pump circuit includes: a flying capacitor; an output capacitor; and the above control circuit which controls charging and discharging states of the flying capacitor and the output capacitor.

Still another embodiment of the present invention relates to a control method for a charge pump circuit having at least one flying capacitor and at least one output capacitor. The control method includes: charging the flying capacitor using an input voltage; charging the output capacitor using charge stored in the flying capacitor; generating an error voltage which is amplified error between a feedback voltage corresponding the an output voltage of the charge pump circuit and a given reference voltage; slicing a triangular wave signal of a given period of time with the error voltage to generate a pulse signal with the pulse width modulated; limiting a pulse width of a pulse signal to a given range; and turning on one of a first switch group and a second switch group during a period corresponding to a high-time of the pulse signal and turning on the other switch group during a period corresponding to a low-time.

Turned-on period of the second switch group may be assigned to the low-time or the high time of the pulse signal, whichever is longer and turned-on period of the first switch group may be assigned to the shorter one.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

A state where "a member A and a member B are connected to each other" includes a case where the members are physically and directly connected to each other or a case where the members are indirectly connected to each other through another member having no effect on the electrical connection state.

Similarly, "a state where a member C is provided between a member A and a member B" includes a case where the member A and the member C or the member B and the member C are directly connected to each other, or a case where the members are indirectly connected through another member having no effect on the electrical connection state.

Figure 1:
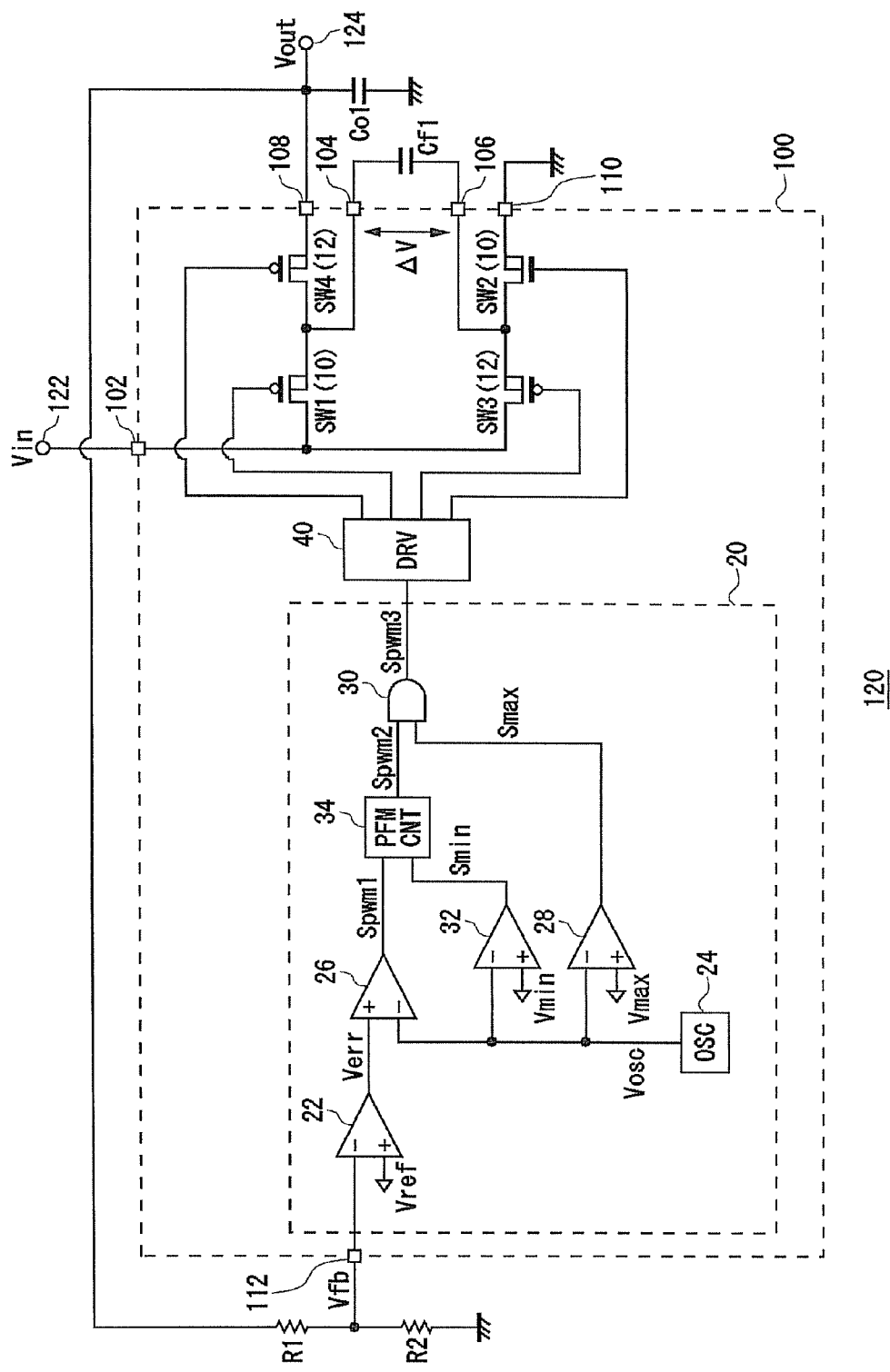
FIG. 1 is a circuit diagram illustrating a configuration of a charge pump circuit according to an embodiment of the present invention.

FIG. 1 is a circuit diagram illustrating a configuration of a charge pump circuit 120 according to an embodiment of the present invention. The charge pump circuit 120 steps up an input voltage Vin inputted into an input terminal 122 and then outputs an output voltage Vout from an output terminal 124. As the input voltage Vin, a battery voltage outputted from a battery (not illustrated) or a power supply voltage Vdd supplied from a power circuit is utilized. The present invention is applicable to a charge pump circuit having any step-up rate, but for easy understanding, description will be made for a charge pump circuit with a step-up rate of two.

The charge pump circuit 120 includes a control circuit 100, a flying capacitor Cf1, an output capacitor Co1 and feedback resistors R1 and R2. The charge pump circuit in FIG. 1 includes one flying capacitor Cf1 and one output capacitor Co1 since its step-up rate is two, but the charge pump circuit may include a plurality of flying capacitors in such a case that it has a different step-up rate or it generates a plurality of output voltages.

The control circuit 100 includes a first switch group 10, a second switch group 12, a pulse modulator 20 and a driver 40 and the control circuit 100 is a functional circuit formed by integrating these components on one semiconductor substrate. An input voltage Vin from the outside is applied to an input terminal 102. Between a capacitor terminal 104 and a capacitor terminal 106, the flying capacitor Cf1 is connected and, between an output terminal 108 and a ground, an output capacitor Co1 is connected. A ground terminal 110 is grounded and a feedback voltage Vfb corresponding to an output voltage Vout is inputted to a feedback terminal 112 The feedback voltage Vfb is a voltage obtained by dividing the output voltage Vout with the feedback resistor R1 and the feedback resistor R2.

Generally, the charge pump circuit generates a stepped up voltage by repeating a charging period φ1, during which the flying capacitor is charged, and a discharging period φ2, during which the output capacitor is charged using charge stored in the flying capacitor.

The first switch group 10 includes at least one switch provided on a path for charging the flying capacitor Cf1 using the input voltage Vin. The first switch group 10 and the flying capacitor Cf1 form a serial path between an input terminal 122 and the ground. In the present embodiment, the first switch group 10 includes a first switch SW1 and a second switch SW2. Specifically, the first switch SW1 is provided between the input terminal 102 and the capacitor terminal 104, while the second switch SW2 is provided between the capacitor terminal 106 and the ground terminal 110. The first switch SW1 is a P-channel MOSFET (Metal Oxide Semiconductor Field Effect Transistor) and the second switch SW2 is an N-channel MOSFET.

The second switch group 12 includes at least one switch provided for charging the output capacitor Co1 using charge stored in the flying capacitor Cf1 during the charging period ϕ1. In the present embodiment, the second switch group 12 includes a third switch SW3 and a fourth switch SW4. Specifically, the third switch SW3 is provided between the input terminal 102 and the capacitor terminal 106, while the fourth switch SW4 is provided between the capacitor terminal 104 and the output terminal 108. The third switch SW3 and the fourth switch SW4 are both P-channel MOSFETs.

The driver 40 includes a level shift circuit to switch gate voltages of the first to the fourth switches SW4 for on/off control.

When the first switch SW1 and the second switch SW2 are both turned on during the charging period ϕ1, an input Vin is applied to one end of the flying capacitor Cf1, and the other end is grounded. Hence, the flying capacitor Cf1 is charged by the input voltage Vin. A potential difference across the flying capacitor Cf1 is shown as ΔV.

When the third switch SW3 and the fourth switch SW4 are both turned on during the discharging period ϕ2, a potential of the capacitor terminal 106 becomes equal to the input voltage Vin, and a potential of the capacitor terminal 104 becomes Vin+ΔV. The potential of the capacitor terminal 104 is applied to the output capacitor Co1 through the fourth switch SW4 to charge the output capacitor Co1.

The driver 40 alternately repeats the charging period ϕ1 and the discharging period ϕ2 to steps up the input voltage Vin. In a conventional charge pump circuit, the lengths of the charging period ϕ1 and the discharging period ϕ2 were fixed because both thereof were respectively assigned to a high level period and a low level period of a clock signal with a duty ratio of 50%. On the other hand, the charge pump circuit 120 according to the present embodiment adjusts the charging period ϕ1 and the discharging period ϕ2.

The pulse modulator 20 generates a pulse signal Spwm3 and supplies the signal to the driver 40. The driver 40 assigns a high-time TH of the pulse signal Spwm3 to one of the charging period ϕ1 and the discharging period ϕ2 and a low time—TL to the other thereof to alternately turn on the first switch group 10 and the second switch group 12.

A feedback voltage Vfb corresponding to an output voltage Vout of the charge pump circuit 120 is inputted to the pulse modulator 20. The pulse modulator 20 adjusts the duty ratio of the pulse signal Spwm3 to match the Vfb with the given reference voltage Vref. The duty ratio refers to a ratio of a period of time Tp (=TH+TL) to a high-time TH. In the present embodiment, the pulse modulator 20 performs pulse width modulation.

Preferably, the driver 40 provides a dead time so that both of the first switch group 10 and the second switch group 12 are not turned on at the same time and set the dead time, during which both of the first switch group 10 and the second switch group 12 are turned off, around a positive edge and a negative edge of the pulse signal Spwm3. A known technique may be used for a setting method of the dead time.

The pulse modulator 20 adjusts the duty ratio of the pulse signal Spwm1 to limit within a determined range. The reason will be described below.

When the duty ratio of the pulse signal Spwm3 is 0%, the first switch group 10 is not turned on and therefore the flying capacitor Cf1 is not charged by the input voltage Vin. Accordingly, charge transfer to the output capacitor Co1 is not performed and hence electric current supply capacity (drive capacity) to a load (not illustrated) connected to the output terminal 124 is kept low (substantially zero).

As the duty ratio of the pulse signal Spwm3 increases to some degree, the charging period ϕ1 for the flying capacitor Cf1 becomes longer. Accordingly, the amount of charge stored in the flying capacitor Cf1 during the charging period ϕ1 increases, and a potential difference ΔV across the flying capacitor Cf1 immediately after the charging period ϕ1 becomes larger.

As described above, the output capacitor Co1 is charged by the voltage of Vin+ΔV during the discharging period ϕ2. Accordingly, when the potential difference ΔV across the flying capacitor Cf1 becomes larger, the amount of charge supplied to the output capacitor Co1 during the discharging period ϕ2 increases. In other words, the current supply capacity to a load increases along with increase of the duty ratio of the pulse signal Spwm3.

As the duty ratio of the pulse signal Spwm3 is increased, the charging period ϕ1 to the flying capacitor Cf1 becomes longer. However, the upper limit of the potential difference ΔV immediately after the charging period ϕ1 is the input voltage Vin. Here, the duty ratio obtained when the potential difference ΔV reaches the upper limit is shown as α%. As the duty ratio of the pulse signal Spwm3 increases beyond α%, the discharging period ϕ2 becomes shorter while the amount of charge supplied to the flying capacitor Cf1 during the charging period ϕ1 is constant. Accordingly, the amount of charge supplied to the output capacitor Co1 during the discharging period ϕ2 becomes smaller along with increase of the duty ratio. Specifically, as the duty ratio of the pulse signal Spwm3 increases beyond α%, the current supply capacity to a load decreases.

When the duty ratio of the pulse signal Spwm3 is 100%, charge transfer from the flying capacitor Cf1 to the output capacitor Co1 is not performed and hence the current supply capacity to a load substantially becomes zero.

Specifically, the current supply capacity of the charge pump circuit 120 is minimum when the duty ratio is 0% or 100% and maximum at a certain value of α%. In other words, there exists a value of the duty ratio that makes the current supply capacity of the charge pump circuit maximum.

Accordingly, an output voltage Vout is monitored to perform feed back so that the current supply capacity of the charge pump circuit 120 is increased when the output voltage Vout decreases, that is, when a load current increases and so that the current supply capacity of the charge pump circuit 120 is decreased when the output voltage Vout increases, that is, when a load current decreases, thus the output voltage Vout can be maintained at a constant value.

If the duty ratio of the pulse signal Spwm3 changes across α%, feedback is made in such a direction that the output voltage Vout deviates from a target value and therefore the output voltage Vout becomes unstable. Accordingly, the charge pump circuit 120 according to the present invention limits the duty ratio of the pulse signal Spwm3 within a given range.

As described above, the charge pump circuit 120 according to the present invention can stabilize the output voltage Vout by controlling the first switch group 10 and the second switch group 12 based on the pulse signal Spwm3, duty ratio of which is limited.

A conventional charge pump circuit has been capable of outputting only an output voltage Vout of 4 V when an input voltage thereof is 2 V. Accordingly, in obtaining a desired voltage of 4 V or less, a linear regulator has been necessarily provided at the front or rear stage of the charge pump circuit and therefore a circuit area has been increased. On the other hand, the charge pump circuit 120 according to the present invention can stabilize the output voltage Vout at a desired value without need of mounting a regulator and thus a circuit area can be small.

Further, when providing a regulator as required conventionally, a power transistor has been inserted on a path from an input terminal, to which an input voltage is supplied, to the load and therefore efficiency has been degraded because of the power loss of the power transistor. On the other hand, the charge pump circuit 120 according to the present invention can eliminate use of such a power transistor, thus achieving high circuit efficiency.

A value of $\alpha$ depends upon a capacitance of the flying capacitor Cf1, the output capacitor Co1 and a frequency (period of time Tp) of the pulse signal Spwm3, but typically 50%. Now, description will be made on a case where $\alpha$ is 50%.

The given range can be set at either one of the followings: (1) 0% to $\beta$max % and (2) $\gamma$ min % to 100%. Description will be made on feedback control in each range.

(1) First Control Method

The pulse modulator 20 modulates the pulse signal Spwm3 so that the longer the high-time becomes as the lower a feedback voltage Vfb is. In this case, an upper limit $\beta$max % is set to the duty ratio of the pulse signal Spwm3 and modulation is performed so that the duty ratio of the pulse signal Spwm3 changes within the range of 0% to the upper limit $\beta$max %.

Preferably, setting is made so as to satisfy $\beta max \leq \alpha$. With this setting, a change across a duty ratio $\alpha$ can be prevented and therefore the output voltage Vout can be stabilized. However, in case that ripple is acceptable for the output voltage Vout, $\beta$max may be set to be larger than $\alpha$. For the highest efficiency of the charge pump circuit, it is preferable to satisfy $\beta max = \alpha$. In the case of $\alpha = 50$, $\beta$max is set to be as large as possible within the range of 0% and 50%.

In the case of max=45%, the high-time TH changes within the range of Tp×(0 to 0.45) and the low-time TL changes within the range of Tp×(1 to 0.55). Specifically, the low-time TL is limited so as to be longer than the high-time TH. In this case, the driver 40 preferably turns on the first switch group 10 during a period corresponding to the high-time TH of the pulse signal Spwm3 and turns on the second switch group 12 during a period corresponding to the low-time TL. In other words, a period, during which the second switch group 12 is on, is set longer. The reason will be described below.

Now, consideration from the output terminal 124 will be made on the capacity, which is desired by the control circuit 100 side. During the charging period $\phi 1$, the fourth switch SW4 turns off and therefore the capacity connected to the output terminal 124 is only the output capacitor Co1. During the second discharging period $\phi 2$, the flying capacitor Cf1 is connected in addition to the output capacitor Co1. When a load current is constant, the larger capacity connected to the output terminal 124 further reduces fluctuations in the output voltage Vout.

Accordingly, by assigning the period corresponding to the high-time TH of the pulse signal Spwm3 to the charging period $\phi 1$, the discharging period $\phi 2$ becomes longer than the charging period $\phi 1$ and therefore ripple of the output voltage Vout can be reduced.

The longer discharging period $\phi 2$ has an advantage that ripple of the output voltage Vout can be further reduced, but in a case where the capacity of the output capacitor Co1 is large or where ripple is acceptable, the high-time TH may be assigned to the discharging period $\phi 2$.

The control circuit 100 in FIG. 1 has a configuration for implementing the first control method. The pulse modulator 20 includes an error amplifier 22, an oscillator 24, a PWM (Pulse Width Modulation) comparator 26, an AND gate 30, a minimum duty comparator 32, a PFM (pulse frequency Modulation) controller 34 and a maximum duty comparator 28.

The error amplifier 22 receives a feedback voltage Vfb at an inverting input terminal and a reference voltage Vref at a non-inverting input terminal, respectively, and amplifies an error between the two voltages. An output of the error amplifier 22 is referred to as an error voltage Verr. The oscillator 24 outputs an oscillating voltage Vosc of a triangular or sawtooth waveform. The PWM comparator 26 receives an error voltage Verr at the non-inverting input terminal; and an oscillating voltage Vosc at the inverting input terminal, respectively. The PWM comparator 26 slices the oscillating voltage Vosc by the error voltage Verr and outputs a pulse signal Spwm1, a level of which changes at an intersection. The pulse width of the pulse signal Spwm1 is modulated so that the output voltage Vout approaches a target value.

The maximum duty comparator 28 receives an oscillating voltage Vosc and the maximum voltage Vmax. The maximum duty comparator 28 slices the oscillating voltage Vosc by the maximum voltage Vmax and generates a maximum pulse signal Smax having a given duty ratio. The maximum voltage Vmax is set so that the duty ratio of the maximum pulse signal Smax matches the value of $\beta$ described above.

The AND gate 30 receives a pulse signal Spwm2 outputted from the PFM controller 34 and the maximum pulse signal Smax to output a result of an AND operation of two signals. The output of the AND gate 30, that is, the duty ratio of the pulse signal Spwm3 matches the duty ratio of the pulse signal Spwm1 when the duty ratio of the pulse signal Spwm1 is equal to or smaller than $\beta$max % and becomes $\beta$max % when the duty ratio of the pulse signal Spwm1 is $\beta$max % or larger. In order to limit the duty ratio of the pulse signal Spwm3, another circuit configuration may be used and the form thereof is not limited.

The pulse modulator 20 compares the duty ratio of a pulse signal Spwm1 with a given lower limit $\beta$min and, when the duty ratio of a pulse signal Spwm1 is smaller than the lower limit $\beta$min, fixes the level of the pulse signal Spwm1 and stops switching of the first switch group 10 and the second switch group 12. In other words, no pulse is outputted from the pulse modulator 20. For this operation, the minimum duty comparator 32 and the PFM controller 34 are provided.

Preferably, the pulse modulator 20 fixes the level of the pulse signal Spwm3 so that the second switch group 12 is turned on when the duty ratio of the pulse signal Spwm3 is smaller than the lower limit $\beta$min. The reason will be described below.

The minimum duty comparator 32 receives an oscillating voltage Vosc and a minimum voltage Vmin. The minimum duty comparator 32 slices the oscillating voltage Vosc with a minimum voltage Vmin to generate a minimum pulse signal Smin having a given duty ratio. A value of the minimum voltage Vmin is set so that the duty ratio of the minimum pulse signal Smin is approximately 20%.

The PFM controller 34 receives a pulse signal Spwm1 and a minimum pulse signal Smin and compares duty ratios of the two signals. When the duty ratio of the pulse signal Spwm1 is smaller than that of the minimum pulse signal Smin, the duty ratio of the pulse signal Spwm2 is fixed to a low level. When the duty ratio of the pulse signal Spwm1 is larger than that of the minimum pulse signal Smin, the pulse signal Spwm2 becomes equal to the pulse signal Spwm1.

The sequence of the AND gate 30 and the PFM controller 34 may be reversed.

Figure 2:
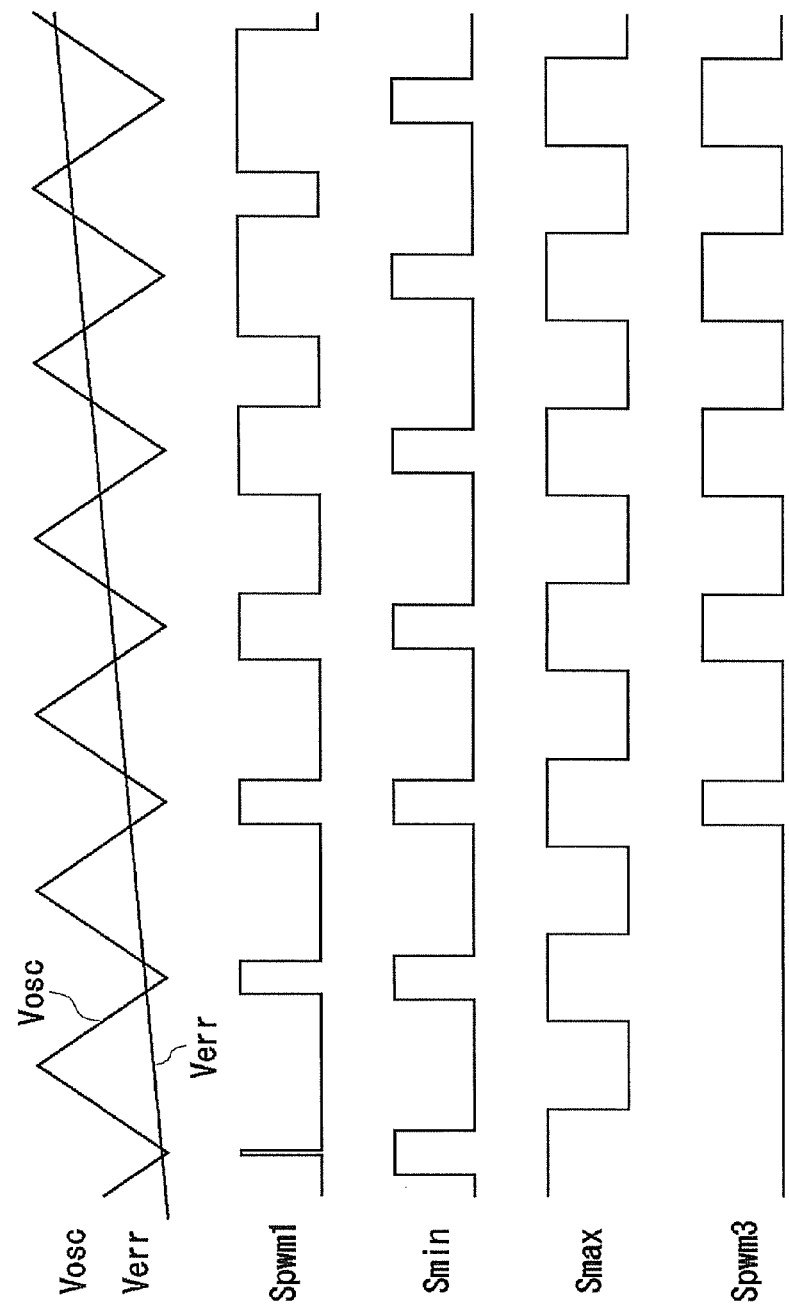
FIG. 2 is a signal waveform diagram of a charge pump circuit in FIG. 1.

Now, description will be made on the operation of the charge pump circuit 120 configured as described above. FIG. 2 is a signal waveform diagram of the charge pump circuit 120 in FIG. 1. The signal waveform diagram illustrated herein is made with its vertical axis and its horizontal axis scaled up or down as needed for simple description or easy understanding.

As the load current increases, more charge is supplied from the output capacitor Co1 to the load and therefore the output voltage Vout decreases and the error voltage Verr increases. As the lower the output voltage Vout becomes, the larger the duty ratio of the pulse signal Spwm1 becomes. However, the duty ratio of the pulse signal Spwm3 is limited to the duty ratio βmax of the maximum pulse signal Smax or smaller. When the duty ratio of the pulse signal Spwm1 is smaller than the duty ratio βmin of the minimum pulse signal Smin, the pulse signal Spwm3 is fixed to a low level, and a pulse is cut.

Figure 3A:
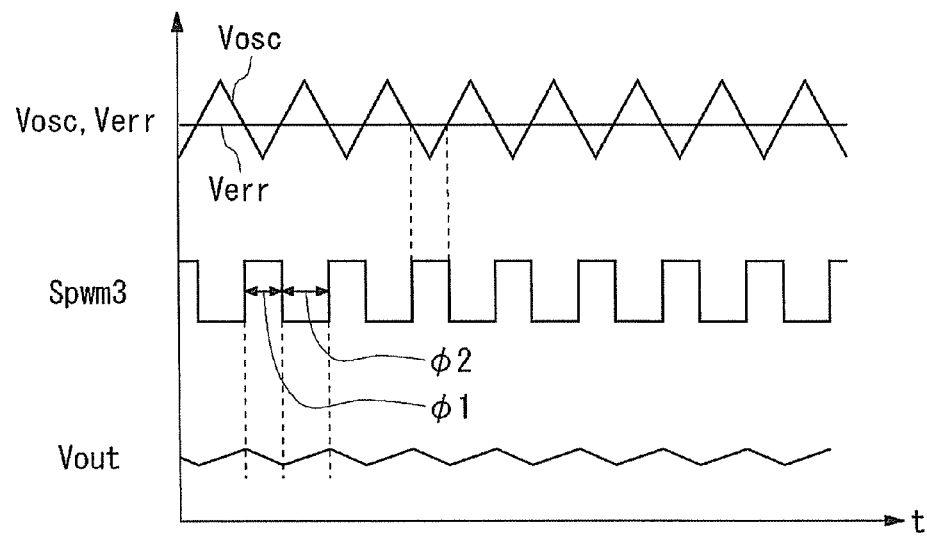
FIGS. 3A and 3B are operational waveform diagrams of the charge pump circuit in FIG. 1 at normal load and light load, respectively.
Figure 3B:
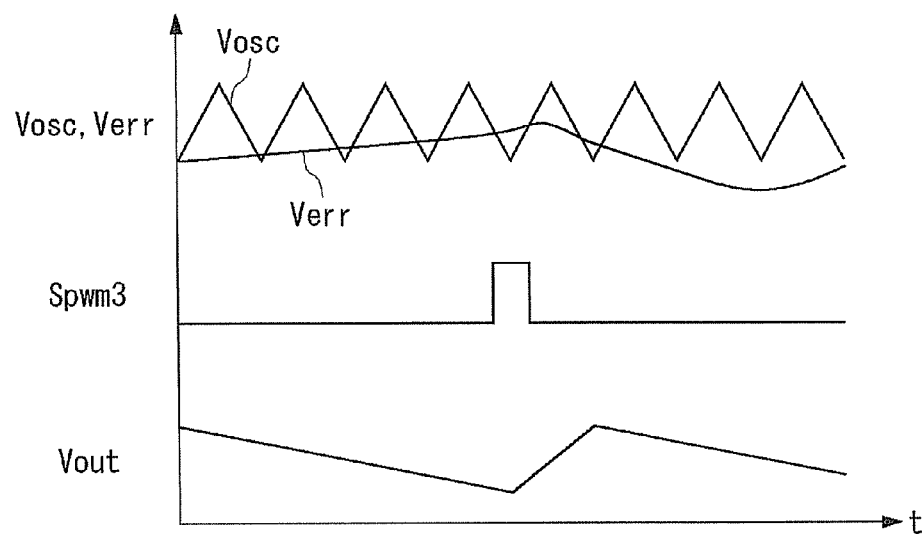

FIGS. 3A and 3B are operational waveform diagrams of the charge pump circuit 120 at normal load and light load, respectively.

As illustrated in FIG. 3A, when a load current is constant value, which is large to some extent, the duty ratio of the pulse signal Spwm1 is adjusted by feedback. The first switch group 10 is turned on while the charging period φ1, during which the pulse signal Spwm3 is at a high level, and the second switch group 12 is turned on while the discharging period φ2, during which the pulse signal Spwm1 is at a low level. During the charging period φ1, a load current flows from the output capacitor Co1 and therefore the output voltage Vout decreases. During the discharging period φ2, the output capacitor Co1 is charged using the flying capacitor Cf1 and therefore the output voltage Vout increases. By repeating the charging period φ1 and the discharging period φ2, the output voltage Vout is stabilized toward to approximate of the target value while slightly varying.

FIG. 3B illustrates the operation at light load. At light load, the duty ratio of the pulse signal Spwm1 becomes smaller than the minimum duty ratio βmin. Hence, switching of the first switch group 10 and the second switch group stops and therefore charging operation of the output capacitor Co1 stops. During this period, the output capacitor Co1 is discharged by a small load current and therefore the output voltage Vout gradually decreases. As the output voltage Vout decreases, an error voltage Verr increases and, when the duty ratio of the pulse signal Spwm1 exceeds the minimum duty ratio βmin at a time t1, the pulse signal Spwm3 is kept at a high level and a charging period φ1 starts. During a discharging period φ2 immediately after the charging period, the output capacitor Co1 is charged, and the output voltage Vout increases. When the output voltage Vout increases, the error voltage Verr decreases again, thus the duty ratio becomes smaller than the minimum duty ratio βmin, and then switching is stopped.

As described above, the charge pump circuit 120 according to the present invention monitors the duty ratio of the pulse signal Spwm3 and cuts a pulse a duty ratio of which is smaller than the lower limit βmin, thus performing operation in an intermittent mode at light load condition. To perform switching on and off of the first switch group 10 and the second switch group 12, drive current, for charging and discharging the gate capacity of each transistor, is essential, but drive current can be suppressed since the charge pump circuit is operated in an intermittent mode, thereby suppressing current consumption of the charge pump circuit 120.

Further, at light load, when the pulse signal Spwm3 is fixed to a low level, the circuit stops the operation with the second switch group 12 on. Hence, combined capacity of the flying capacitor Cf1 and the output capacitor Co1 is connected to the output terminal 124, thus reducing ripple of the output voltage Vout.

However, the present invention is not limited thereto and a pulse signal Spwm3 may be fixed to a high level at light load.

Ripple of an output voltage Vout illustrated in FIG. 3B is larger than that in FIG. 3A, but in practice, is equal to or smaller than that in FIG. 3A. This is because, at light load condition where a load current is low, the discharging amount from the output capacitor Co1 is small and thus the reduced amount of the output voltage Vout is small.

The above describes the operation of the charge pump circuit 120 according to the present embodiment. It should be noted that the pulse modulation technique of the charge pump circuit 120 is of different thought from that of a switching regulator. Specifically, in performing pulse width modulation with a step-up switching regulator, a duty ratio Dsr of a generated pulse signal is given by the following equation:

$$Dsr = 1 - Vin/Vout$$

In other words, the duty ratio of a pulse signal is adjusted in accordance with an input voltage Vin and a target value of an output voltage Vout.

On the other hand, in the pulse modulation of the charge pump circuit 120 according to the present invention, the duty ratio of a pulse signal Spwm3 is determined according to a load current, at this point the pulse modulation of the charge pump circuit 120 according to the present invention is different from the pulse modulation of the switching regulator.

In the switching regulator, feed back is performed in such a direction that an output voltage Vout increases as the duty ratio is increased, while in the charge pump circuit, the direction of feedback is reversed when the duty ratio increases across a certain boundary. Accordingly, the charge pump circuit 120 according to the present invention has a limit in the range of the duty ratio of the pulse signal Spwm3.

(2) Second Control Method

In the first control method, a pulse signal was modulated so that the longer a high-time TH becomes, as the lower a feedback voltage Vfb is. On the other hand, in a second control method, a pulse signal Spwm3 is modulated so that the longer a low-time TL becomes, as the lower a feedback voltage Vfb is. A lower limit γmin % is set to the duty ratio of a pulse signal Spwm3, and modulation is performed so that the duty ratio of the pulse signal Spwm3 changes in a range from the lower limit γmin % to 100%.

In this case, it is preferable to set γmin to satisfy γmin≧α. With this setting, a change across α can be prevented and therefore the output voltage Vout can be stabilized. However, in case that ripple is acceptable for the output voltage Vout, γmin may be set to be smaller than α.

For the highest efficiency of the charge pump circuit, it is preferable to satisfy γmin=α. In the case of α=50, γmin is set to be as small as possible within the range of 50% to 100%.

In the case of γmin=55%, the high-time TH changes within the range of Tp×(0.55 to 1) and a low-time TL changes within the range of Tp×(0.45 to 0). Specifically, the high-time TH is limited so as to be longer than the low-time TL. In this case, the driver 40 preferably turns on the first switch group 10 during a period corresponding to a low-time TL of a pulse signal Spwm3 and turns on the second switch group 12 during a period corresponding to the high-time TH. In other words, a period, during which the second switch group 12 is turned on, is set longer. This allows ripple of an output voltage Vout to be reduced.

To implement the second control method, the control circuit 100 in FIG. 1 may be modified. For example, a reference voltage Vref may be inputted into an inverting input terminal of the error amplifier 22 and a feedback voltage Vfb may be inputted into a non-inverting input terminal. In this case, the smaller a load current is, that is, the larger an output voltage Vout is, the larger the error voltage Verr becomes and the closer the duty ratio of the pulse signal Spwm1 approaches 100%. Hence, the current supply capacity to a load decreases and therefore appropriate feedback can be applied. When the load current increases, the duty ratio approaches a and the current supply capacity increases.

In this case, a pulse signal having a duty ratio of γmin may be generated by the maximum duty comparator 28 and the duty ratio of the pulse signal may be limited to γmin or larger.

To implement an intermittent mode at light load according to the second control method, an upper limit γmax is set as the duty ratio of a pulse signal Spwm3 and, when the duty ratio of the pulse signal Spwm3 is larger than the upper limit γmax, the level of the pulse signal Spwm3 is fixed. In this case, a pulse signal having a duty ratio of γmax may be generated by the minimum duty comparator 32.

The same effect as the first control system may be attained by the second control system.

The charge pump circuit 120 according to the present invention has been described above. The above embodiments are illustrative and those skilled in the art will recognize that many alternative embodiments in combinations of respective components and processes thereof and that the alternative embodiments are within the scope of the present invention. Now, description will be made on such alternative embodiments.

The configuration of the charge pump circuit is not limited to the topology. For example, a diode may be used in place of a transistor switch. In the present embodiment, a charge pump circuit with a step-up rate of two has been described, but an adding charge pump circuit, which adds two input voltages, may be used. In this case, a terminal for connecting a first switch with a third switch in common may be separated to provide a first input terminal and a second input terminal. Then, one end of the first switch SW1 may be connected to the first input terminal and one end of the third switch SW3 may be connected with the second input terminal.

A charge pump circuit having a step-up rate of 1.5 or 4, or a charge pump circuit capable of switching a plurality of step-up rates may be used. Furthermore, the present invention is applicable to a voltage-inverting charge pump circuit for generating negative voltage.

The present embodiment has described for a case where the first to fourth switches SW1 to SW4 are built in a control circuit 100, but the switches may be provided outside the control circuit 100, using a discrete element.

The present embodiment has described for a case of a pulse width modulation, in which a pulse modulator 20 slices a triangular or sawtooth wave to generate a pulse signal, but the modulation method is not limited thereto. For example, pulse frequency modulation or a pulse density modulation may be used. Specifically, any modulation method, in which the duty ratio of a pulse signal can be adjusted so that an output voltage Vout approaches a target voltage and the duty ratio is limited in a given range, can be used.

The logic level of each signal is not limited to that of the present embodiment and may be inverted as needed.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a charge pump circuit having at least one flying capacitor and at least one output capacitor, comprising:
   a first switch group including at least one switch provided on a path for charging the flying capacitor using an input voltage;
   a second switch group including at least one switch provided on a path for charging the output capacitor using charge stored in the flying capacitor;
   a pulse modulator which generates a pulse signal having a duty ratio adjusted so that a feedback voltage corresponding to an output voltage of the charge pump circuit matches a given reference voltage; and
   a driver which receives the pulse signal from the pulse modulator, turns on one of the first switch group and the second switch group during a period corresponding to a high-time of the pulse signal and turns on the other switch group during a period corresponding to a low-time thereof, wherein
   the pulse modulator limits the duty ratio of the pulse signal within a given range.

2. The control circuit according to claim 1, wherein
   the pulse modulator performs pulse width modulation, in which a period of time is constant and pulse width is changed.

3. The control circuit according to claim 1, wherein
   the pulse modulator modulates the pulse signal so that the high-time thereof becomes longer as the feedback voltage is lower and performs modulation so that the duty ratio of the pulse signal changes within the range equal to or smaller than a predetermined upper limit.

4. The control circuit according to claim 3, wherein
   the driver turns on the first switch group during a period corresponding to the high-time of the pulse signal and turns on the second switch group during a period corresponding to the low-time thereof.

5. The control circuit according to claim 3, wherein
   the upper limit is larger than 0 % and equal to or smaller than the duty ratio, which makes current supply capacity to a load of a charge pump circuit maximum.

6. The control circuit according to claim 3, wherein
   the pulse modulator further compares the duty ratio of the pulse signal with a given lower limit and, when the duty ratio of the pulse signal is smaller than the lower limit, fixes the level of the pulse signal.

7. The control circuit according to claim 6, wherein the pulse modulator fixes the level of the pulse signal so that the second switch group is turned on when the duty ratio of the pulse signal is smaller than the lower limit.

8. The control circuit according to claim 1, wherein
   the pulse modulator modulates the pulse signal so that a low-time thereof becomes longer as the feedback voltage is lower, and performs modulation so that the duty ratio of the pulse signal changes within a range equal to or larger than a predetermined lower limit.

9. The control circuit according to claim 8, wherein
   the driver turns on the first switch group during a period corresponding to the low-time of the pulse signal and turns on the second switch group during a period corresponding to the high-time thereof.

10. The control circuit according to claim 8, wherein
    the lower limit is smaller than 100 % and equal to or larger than the duty ratio, which makes current supply capacity to a load of a charge pump circuit maximum.

11. The control circuit according to claim 8, wherein
the pulse modulator further sets an upper limit to the duty ratio of the pulse signal and fixes the level of the pulse signal when the duty ratio of the pulse signal is larger than the upper limit.

12. The control circuit according to claim 11, wherein
the pulse modulator fixes the level of the pulse signal so that the second switch group is turned on when the duty ratio of the pulse signal is larger than the upper limit.

13. A charge pump circuit comprising:
a flying capacitor;
an output capacitor; and
a control circuit which controls charging and discharging states of the flying capacitor and the output capacitor, the control circuit comprising:
a first switch group including at least one switch provided on a path for charging the flying capacitor using an input voltage;
a second switch group including at least one switch provided on a path for charging the output capacitor using charge stored in the flying capacitor;
a pulse modulator which generates a pulse signal having a duty ratio adjusted so that a feedback voltage corresponding to an output voltage of the charge pump circuit matches a given reference voltage; and
a driver which receives the pulse signal from the pulse modulator, turns on one of the first switch group and the second switch group during a period corresponding to a high-time of the pulse signal and turns on the other switch group during a period corresponding to a low-time thereof, wherein
the pulse modulator limits the duty ratio of the pulse signal within a given range.

14. A control method for a charge pump circuit having at lest one flying capacitor and at least one output capacitor, comprising:
charging the flying capacitor using an input voltage;
charging the output capacitor using charge stored in the flying capacitor;
generating an error voltage which is an amplified error between a feedback voltage corresponding to the output voltage of the charge pump circuit and a given reference voltage;
slicing a triangular wave signal of a given period of time with the error voltage to generate a pulse signal with the pulse width modulated;
limiting a pulse width of the pulse signal to a given range; and
turning on one of the first switch group and the second switch group during a period corresponding to a high-time of the pulse signal and turning on the other switch group during a period corresponding to a low-time.

15. The control method according to claim 14, wherein
turned-on period of the second switch group is assigned to the low-time or the high-time of the pulse signal, whichever is longer and turned-on period of the first switch group is assigned to the shorter one.

* * * * *